United States Patent
Moribe et al.

(10) Patent No.: US 8,351,083 B2
(45) Date of Patent: Jan. 8, 2013

(54) IMAGE PROCESSING APPARATUS AND METHOD THEREOF FOR DECREASING THE TONAL NUMBER OF AN IMAGE

(75) Inventors: Shoei Moribe, Tokyo (JP); Takashi Ochiai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 12/423,414

(22) Filed: Apr. 14, 2009

(65) Prior Publication Data
US 2009/0262372 A1  Oct. 22, 2009

(30) Foreign Application Priority Data
Apr. 18, 2008 (JP) ................... 2008-109546

(51) Int. Cl.
*H04N 1/40* (2006.01)
(52) U.S. Cl. ................ 358/3.05; 358/3.03; 358/3.04
(58) Field of Classification Search ........... 358/3.03, 358/3.04, 3.05
See application file for complete search history.

(56) References Cited

U.S. PATENT DOCUMENTS

| | | | | |
|---|---|---|---|---|
| 5,014,333 A | * | 5/1991 | Miller et al. | 382/252 |
| 5,553,166 A | * | 9/1996 | Kakutani | 382/252 |
| 6,707,576 B1 | | 3/2004 | Chang | |
| 6,965,696 B1 | * | 11/2005 | Tokuyama et al. | 382/224 |
| 2002/0196484 A1 | * | 12/2002 | Chang | 358/534 |

FOREIGN PATENT DOCUMENTS

| | | |
|---|---|---|
| EP | 0545734 A2 | 6/1993 |
| JP | 09-102869 A | 4/1997 |
| JP | 2000-196875 A | 7/2000 |
| JP | 2001-326818 A | 11/2001 |
| JP | 2002-374412 | 12/2002 |
| JP | 2004-048194 A | 2/2004 |
| JP | 2004048194 A * | 2/2004 |

OTHER PUBLICATIONS

The above references were cited in a Mar. 16, 2012 Japanese Office Action, which is enclosed without English Translation, that issued in Japanese Patent Application No. 2008-109546.
Keith T. Knox et al., Threshold Modulation in Error Diffusion, Journal of Electronic Imaging, Jul. 1, 1993, vol. 2, No. 3, pp. 185-192.

(Continued)

*Primary Examiner* — King Poon
*Assistant Examiner* — Jamares Q Washington
(74) *Attorney, Agent, or Firm* — Cowan, Liebowitz & Latman, P.C.

(57) ABSTRACT

Image data of a pixel of interest is inputted, diffusion data diffused from errors occurred by decrease of a tonal number of image data is added to the image data of the pixel of interest, the tonal number of the image data of the pixel of interest, to which the diffusion data has been added, is decreased using an error diffusion method or minimized average error method, and an error occurred in the decrease of the tonal number for the pixel of interest is diffused to pixels close to the pixel of interest. Further, the errors occurred by the decrease of the tonal number of the image data in a predetermined image region are integrated as an integrated error, and a threshold value used in the error diffusion method or minimized average error method is set based on the image data of the pixel of interest and the integrated error.

14 Claims, 6 Drawing Sheets

OTHER PUBLICATIONS

Reiner Eschbash et al., Threshold Modulation and Stability in Error Diffusion, IEEE Signal Processing Magazine, Jul. 1, 2003, vol. 20, No. 4, pp. 39-50.

The above references were cited in a European Search Report issued on Nov. 21, 2012, a copy of which is enclosed, that issued in the corresponding European Patent Application No. 09156873.3.

* cited by examiner

FIG. 2

| | * | 7/16 |
|---|---|---|
| 3/16 | 5/16 | 1/16 |

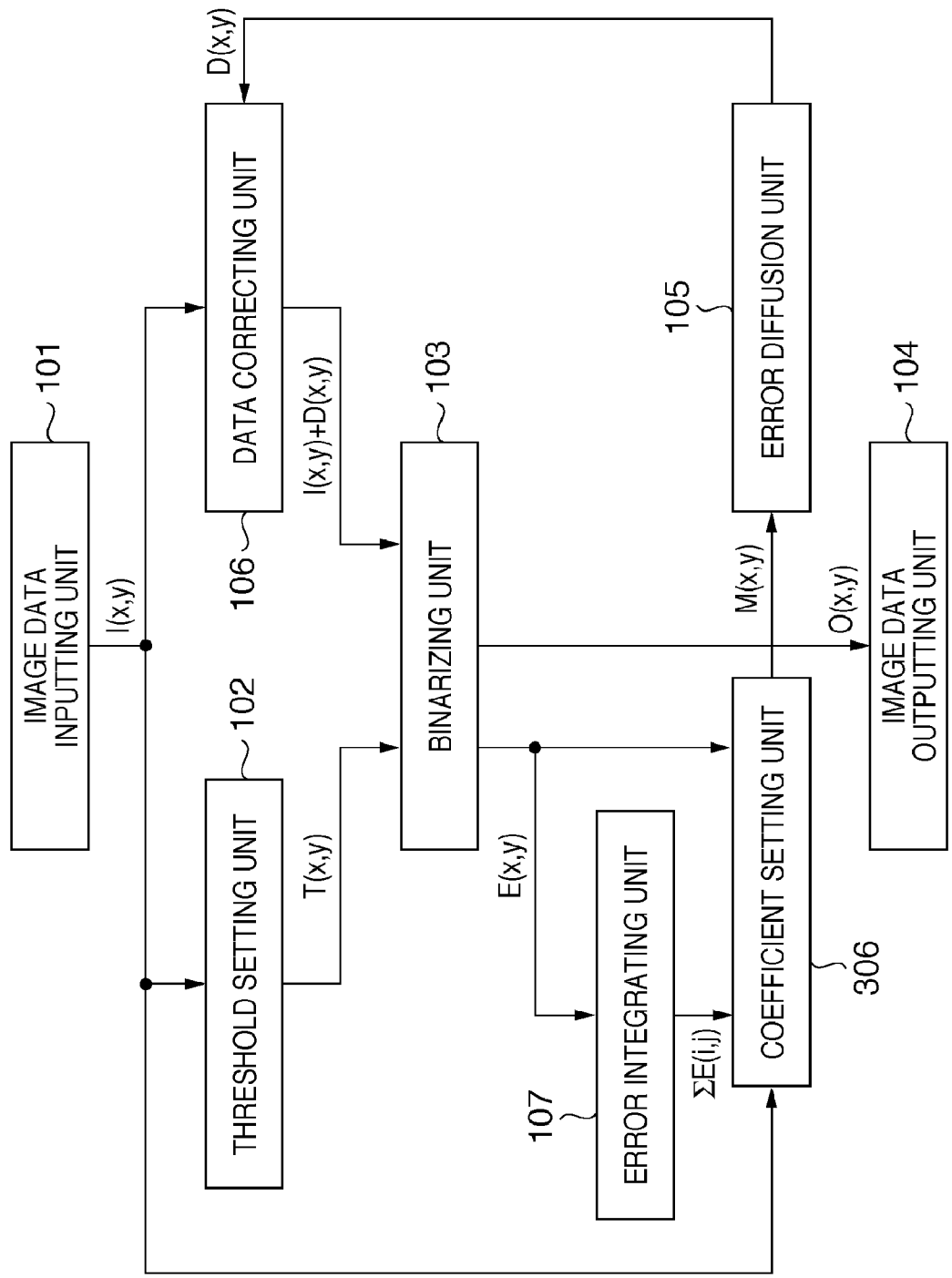

|  | 1/16 | 3/16 |
|---|---|---|
|  | * | 7/16 |
|  |  | 5/16 |

FIG. 4C

|  | 12/16 | 1/16 |
|---|---|---|
|  | * | 2/16 |
|  |  | 1/16 |

FIG. 4B

|  | 7/16 | 1/16 |
|---|---|---|
|  | * | 5/16 |
|  |  | 3/16 |

FIG. 4A

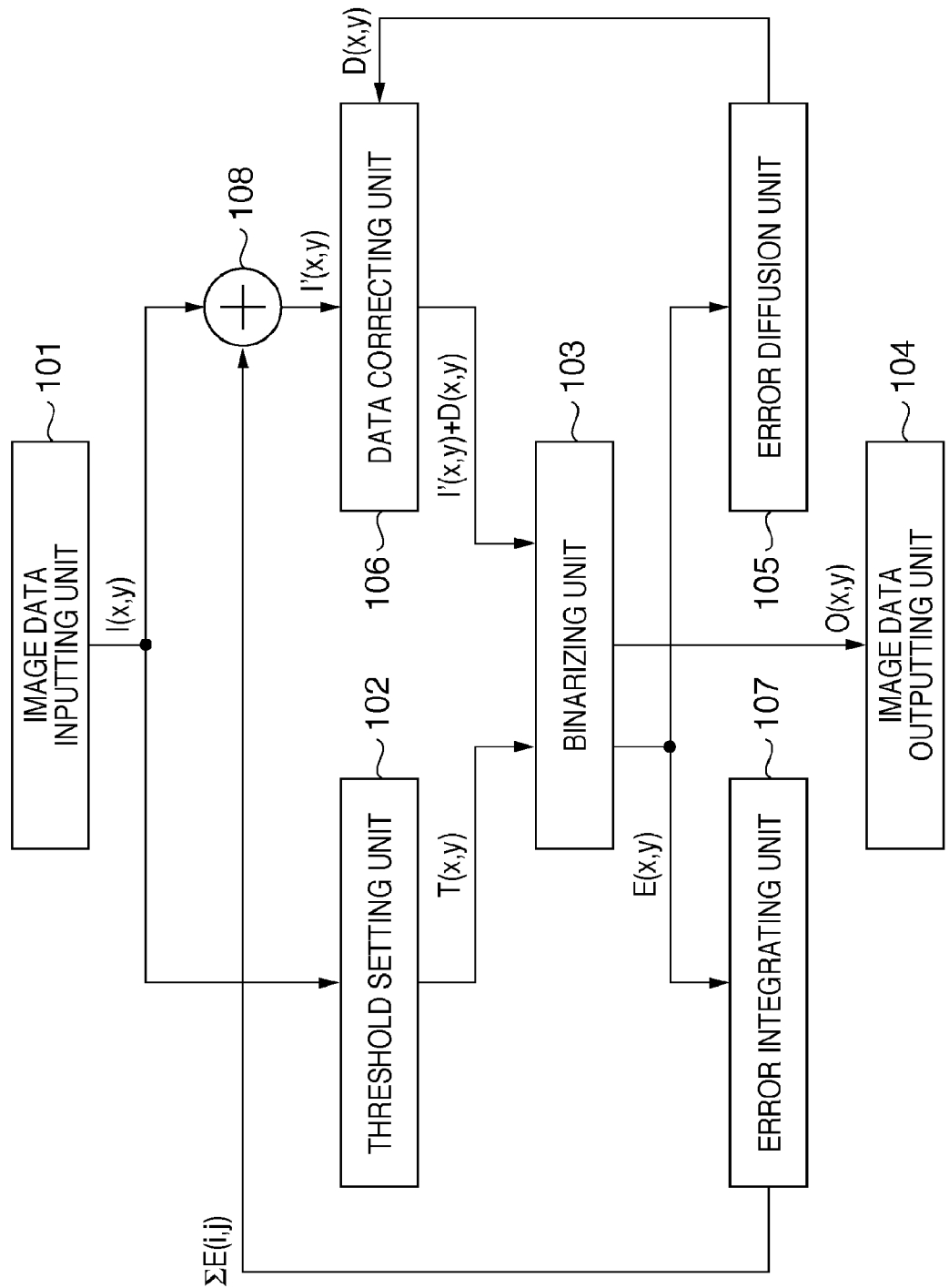

IMAGE PROCESSING APPARATUS AND METHOD THEREOF FOR DECREASING THE TONAL NUMBER OF AN IMAGE

BACKGROUND OF THE INVENTION

1. Field of the Invention

The present invention relates to an image processing apparatus and method thereof and, more particularly, to an image processing apparatus which decreases the tonal number of an image, and a method thereof.

2. Description of the Related Art

Image data having multi-tonal levels read by an image input apparatus such as a scanner and image data of graphics having multi-tonal levels generated or edited by a computer are represented by a display, printer, facsimile, digital copying machine, and the like. In this case, in order to save and transfer image data having multi-tonal levels, the data amount of image data is often reduced by decreasing the tonal number.

Various methods are available for conversion required to decrease the tonal number. For example, an error diffusion method and a minimized average error method nearly equivalent to the error diffusion method are popularly used as methods that realize preferred image quality.

However, the error diffusion method and minimized average error method suffer the following problems.

The first problem is delay of pixel generation. That is, generation of black pixels in a density region in which the density increases from a low density to intermediate and high densities (to be referred to as a rising part hereinafter) delays. Likewise, generation of white pixels in a density region in which the density decreases from a high density to intermediate and low densities (to be referred to as a falling part hereinafter) delays. Note that the delay of generation of pixels means a state in which when, for example, pixel values are checked in a raster-scan order, image data having multi-tonal levels have transited from a low density region to intermediate and high density regions, but transition of corresponding converted image data from the low density region to the intermediate and high density regions is not complete yet. Likewise, the delay means a state in which image data having multi-tonal levels have transited from a high density region to intermediate and low density regions, but transition of corresponding converted image data from the high density region to the intermediate and low density regions is not complete yet.

The second problem is reproducibility of a fine line. That is, a line which has a small density difference from a background region and has a small width may often be represented while being broken in the middle of it (to be referred to as "break" hereinafter) or may not be represented (to be referred to as "vanishing" hereinafter).

These problems occur since an error to be diffused adversely affects surrounding pixels. In order to solve these problems, Japanese Patent Laid-Open No. 2002-374412 sets a binarization threshold value T by:

$$T(x,y) = \{I(x,y) \times (K-1) + 128\}/K \quad (1)$$

where $I(x, y)$ is the pixel value of an original image at a pixel position $(x, y)$, and K is an arbitrary natural number equal to or larger than 2.

The method of uniquely setting the binarization threshold value $T(x, y)$ from the data $I(x, y)$ of the original image can provide a certain effect for delay of pixel generation, but it is insufficient to guarantee good reproducibility of a fine line. Hence, a break or vanishing occurs.

SUMMARY OF THE INVENTION

In one aspect, an image processing apparatus comprises: an input section, configured to input image data of a pixel of interest; an adder, configured to add diffusion data diffused from errors occurred by decrease of a tonal number of image data to the image data of the pixel of interest; a converter, configured to decrease the tonal number of the image data of the pixel of interest, to which the diffusion data has been added, using an error diffusion method or minimized average error method; and a diffuser, configured to diffuse an error occurred in the decrease of the tonal number for the pixel of interest to pixels close to the pixel of interest, wherein the apparatus further comprising: a calculator, configured to integrate the errors occurred by the decrease of the tonal number of the image data in a predetermined image region as an integrated error; and a threshold setting section, configured to set a threshold value used in the error diffusion method or minimized average error method based on the image data of the pixel of interest and the integrated error.

In another aspect, an image processing method comprises the steps of: inputting image data of a pixel of interest; adding diffusion data diffused from errors occurred by decrease of a tonal number of image data to the image data of the pixel of interest; decreasing the tonal number of the image data of the pixel of interest, to which the diffusion data has been added, using an error diffusion method or minimized average error method; and diffusing an error occurred in the decrease of the tonal number for the pixel of interest to pixels close to the pixel of interest, wherein the method further comprising the steps of: integrating the errors occurred by the decrease of the tonal number of the image data in a predetermined image region as an integrated error; and setting a threshold value used in the error diffusion method or minimized average error method based on the image data of the pixel of interest and the integrated error.

According to these aspects, delay of pixel generation and reproducibility of a fine line can be reclaimed in conversion processing of the tonal number.

Further features of the present invention will become apparent from the following description of exemplary embodiments with reference to the attached drawings.

BRIEF DESCRIPTION OF THE DRAWINGS

FIG. 2 is a view showing an example of an error diffusion matrix indicating ratios of an error to be diffused to close pixels.

FIG. 3 is a block diagram showing the functional arrangement of an image processing apparatus according to the second embodiment.

FIGS. 4A to 4C are views showing an example of three types of error diffusion coefficients which are selectively set by a coefficient setting unit.

FIG. 6 is a block diagram showing another functional arrangement of an image processing apparatus according to the first embodiment.

DESCRIPTION OF THE EMBODIMENTS

An image processing apparatus and method thereof according to embodiments of the present invention will be described in detail hereinafter with reference to the drawings. An example will be explained hereinafter wherein the present invention is applied to the error diffusion method. However, the present invention may be applied to the minimized average error method. In the following description, the tonal number after tonal number conversion is "2". However, the tonal number after conversion is not limited to "2".

First Embodiment

Figure 1:
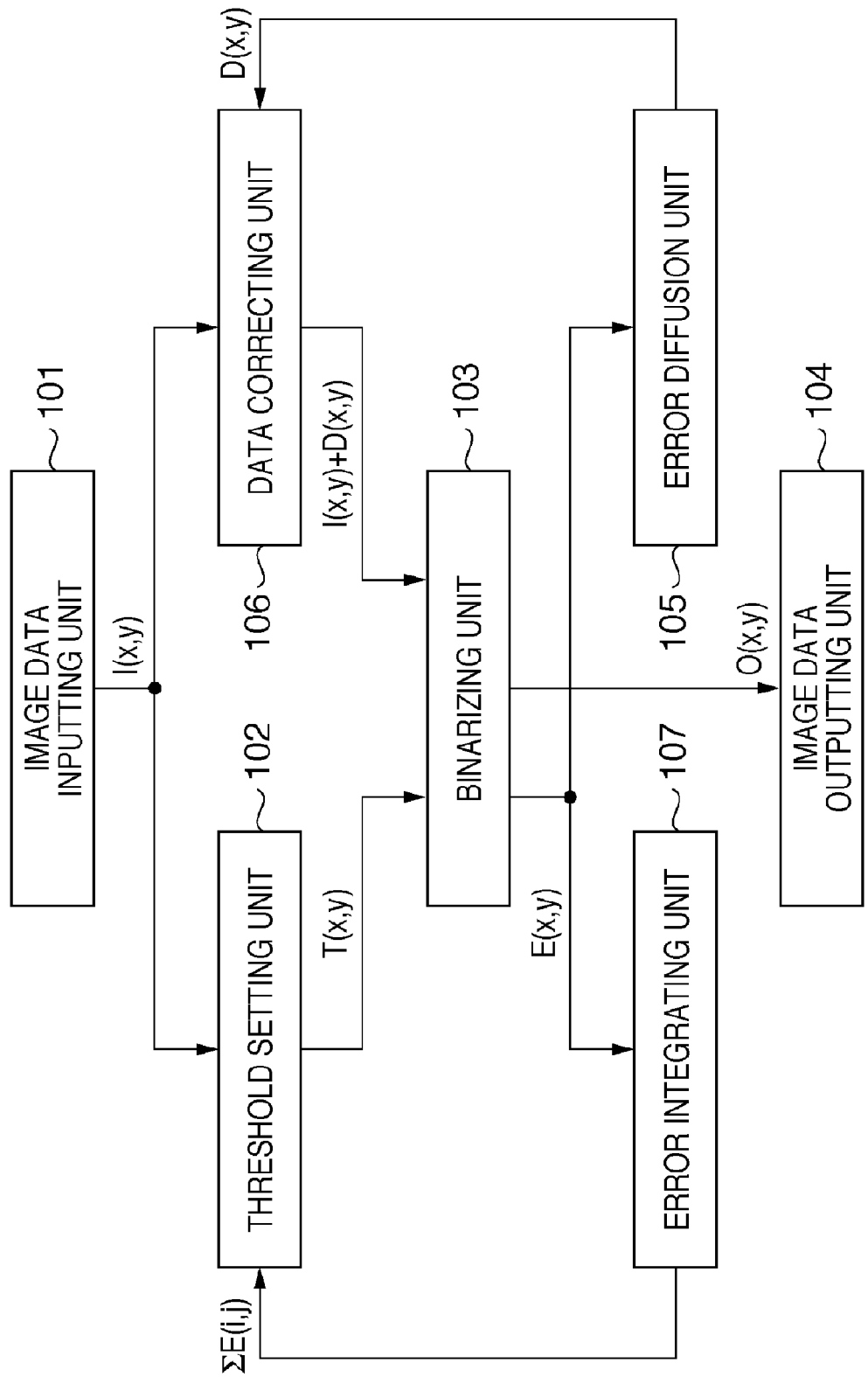
FIG. 1 is a block diagram showing the functional arrangement of an image processing apparatus according to the first embodiment.

As the first embodiment, an example in which a threshold value (or input value) is changed according to the sum total of errors will be explained.
[Apparatus Arrangement]
FIG. 1 is a block diagram showing the functional arrangement of an image processing apparatus according to the first embodiment.

An image data inputting unit 101 inputs original image data I(x, y), the tonal number of which is to be converted. Note that (x, y) represents a pixel position, and I(x, y) represents a density value at the pixel position (x, y). Of course, I(x, y) is not limited to the density value, and original image data may be an arbitrary image signal.

A threshold setting unit 102 sets a threshold value T(x, y) based on the original image data I(x, y) and an integrated error $\Sigma E(i, j)$ according to:

$$T(x,y)=Tb+N(x,y)-k\Sigma E(i,j) \quad (2)$$

where Tb is the reference-threshold value uniquely defined based on the value of the original image data I(x, y), N(x, y) is the threshold noise set according to the pixel position on an original image represented by the original image data, and k is a coefficient for decreasing the integrated error $\Sigma E(i, j)$.

As will be described in detail later, the integrated error $\Sigma E(i, j)$ is obtained by an error integrating unit 107, and is an integrated value of errors, which occur in an arbitrary region where the tonal number has already been converted. This integrated error is different from an integrated value D(x, y) of diffusion errors obtained by an error diffusion unit 105.

The value of the coefficient k (feedback parameter) is set to be about 0.08 according to the experiments of the inventors so as to obtain preferred results. However, ⅛ or 1/16 which can be implemented by bit calculations may be adopted as the coefficient k in consideration of calculation efficiency.

The reference-threshold value Tb may be a fixed value such as 128. In this case, when the coefficient k is set to be a slightly larger value, e.g., about 0.15, the preferred results can be obtained. When the memory size required for calculations and the calculation load are to be reduced, the reference-threshold value Tb is preferably set to be a fixed value.

As the threshold noise N(x, y), noise having a relatively high frequency is preferably used.

A binarizing unit 103 compares the threshold value T(x, y) and correction data I(x, y)+D(x, y), and outputs a binarization result O(x, y) and occurred error E(x, y).

$$\text{if } (I(x, y) + D(x, y) > T(x, y)) \quad (3)$$
$$O(x, y) = 1;$$
$$\text{else}$$
$$O(x, y) = 0;$$
$$E(x, y) = I(x, y) + D(x, y) - O(x, y) \times 255; \quad (4)$$

where D(x, y) is the integrated value of diffusion errors obtained by the error diffusion unit 105.

An image data outputting unit 104 outputs image data O(x, y) as the binarization result output from the binarizing unit 103 to a printer or the like. The printer generates a dot on a print sheet if O(x, y)='1', and does not generate any dot if O(x, y)='0'.

Figure 2:
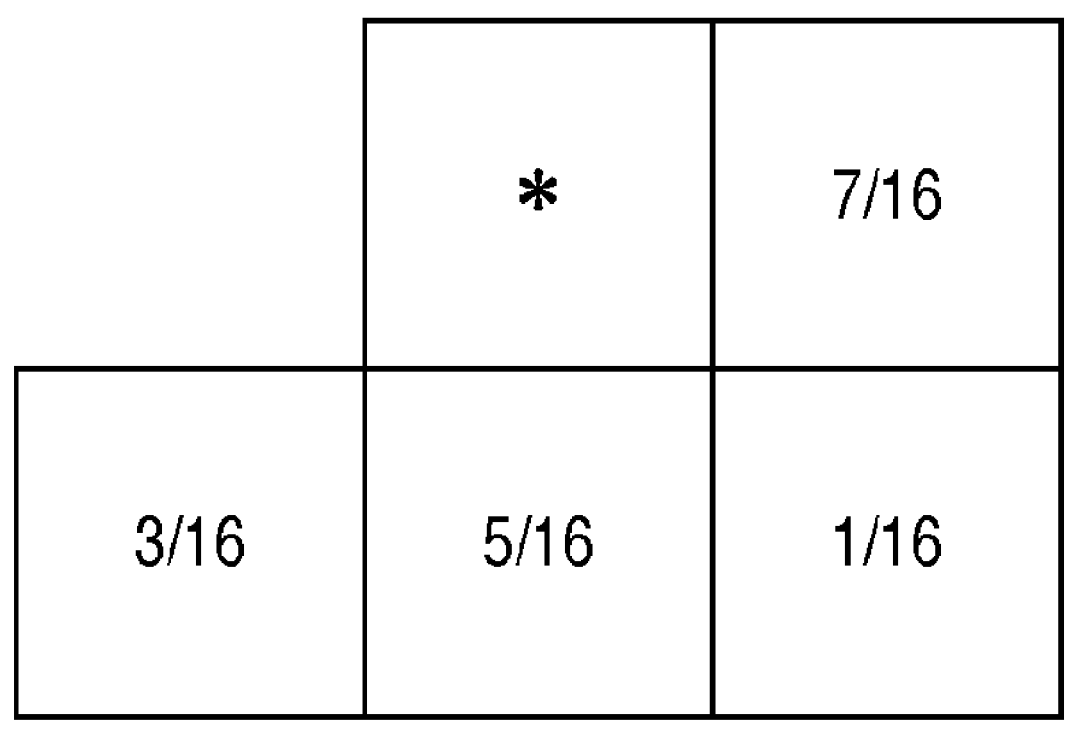

The error diffusion unit 105 diffuses the occurred error E(x, y) of the binarization result output from the binarizing unit 103 to pixels close to a pixel of interest (to be referred to as close pixels hereinafter). FIG. 2 is a view showing an example of an error diffusion matrix indicating a pixel of interest indicated by "*" and ratios of diffusing an error to respective close pixels. Upon application of the error diffusion matrix shown in FIG. 2, an arbitrary pixel receives a sum of errors diffused from four close pixels except for pixels at image ends. That is, the sum of errors received by a certain pixel (x, y) is the integrated value D(x, y) of diffusion errors.

A data correcting unit 106 obtains the correction data I(x, y)+D(x, y) by adding the original image data I(x, y) and the integrated value D(x, y) of diffusion errors corresponding to a pixel at the pixel position (x, y).

The error integrating unit 107 integrates the integrated error $\Sigma E(i, j)$ from the occurred errors E(x, y). In this embodiment, assume that the integrated error $\Sigma E(i, j)$ is the sum total of the occurred errors E(x, y) of processed pixels. However, the integrating range indicated by (i, j) is not limited to all processed pixels, but it may be a range for one line or an arbitrary range defined by dividing an image region. When the binarization result of I(x, y)=0 is always O(x, y)=0, an occurred error E(x, y) of a pixel having a value I(x, y)=0 may be inhibited from being added to the integrated error $\Sigma E(i, j)$. That is, the integrating range of the integrated error $\Sigma E(i, j)$ is not particularly limited.

The error integrating unit 107 preferably sets an upper limit value UL and lower limit value LL for the value of the integrated error $\Sigma E(i, j)$ so that the value of the integrated error $\Sigma E(i, j)$ falls within an appropriate range:

$$\text{if } (\Sigma E(i, j) > UL) \quad (5)$$
$$\Sigma E(i, j) = UL;$$
$$\text{else if } (\Sigma E(i, j) < LL)$$
$$\Sigma E(i, j) = LL;$$

In general error diffusion processing, when the integrated value D(x, y) of diffusion errors assumes too large a value, a problem of image quality occurs. When the upper and lower limit values are set for the integrated value D(x, y) of diffusion errors, an error to be diffused may be lost, and the average density of an input image may be different from that of an output image, thus posing a problem. On the other hand, as in this embodiment, the upper and lower limit values are set for the integrated error $\Sigma E(i, j)$. When the integrated error $\Sigma E(i, j)$ exceeds the upper limit value, it is restricted to the upper limit value. When the integrated error $\Sigma E(i, j)$ is lower than the lower limit value, it is restricted to the lower limit value. As a result, an error to be diffused can be prevented from being lost, and the aforementioned problem does not occur. Of course, a method of making the value of the integrated error $\Sigma E(i, j)$ fall within an appropriate range is not limited to the aforementioned method. For example, every time one pixel is processed, a predetermined value may be added to or subtracted from the integrated error $\Sigma E(i, j)$.

In place of integration of occurred errors E(x, y), an error E(i, j) may use integration of errors E'(x, y), each of which is given by:

$$E'(x,y)=I(x,y)-O(x,y)\times 255$$

or $$E'(x,y)=D(x,y)\times 255 \quad (6)$$

[Description of Principle]

This embodiment solves the delay problem of pixel generation by decreasing the error E(i, j) by varying the threshold value T(x, y) based on the error E(i, j). The reason for this will be explained below.

When the integrated error ΣE(i, j) assumes a large positive value, the threshold value T(x, y) set by the threshold setting unit 102 becomes small. Then, the binarization result O(x, y) output from the binarizing unit 103 tends to assume '1' and the occurred error E(x, y) tends to assume a negative value. Since this occurred error E(x, y) is added to the integrated error ΣE(i, j), the integrated error ΣE(i, j) consequently draws near to zero. The same applies to a case in which the integrated error ΣE(i, j) assumes a large negative value.

The fact that the integrated error ΣE(i, j) which is integrated in the scan direction of pixels draws near to zero is equivalent to that the difference between the average value of the original image data I(x, y) and that of the binarization results O(x, y) draws near to zero in a calculation region of the error E(i, j). For this reason, delay of pixel generation is suppressed, and reproducibility of a fine line can be improved.

Since this embodiment merely adds an arrangement for integrating the integrated error ΣE(i, j) to that of a general error diffusion method, increases in cost and calculation volume are slight.

The example in which the integrated error ΣE(i, j) is reflected in the threshold value T(x, y) has been explained. Alternatively, when the error E(i, j) is reflected in the original image data I(x, y) or correction data I(x, y)+D(x, y), a nearly equivalent result is obtained. That is, as shown in FIG. 6, an adder 108 which makes a calculation given by:

$$I'(x,y)=I(x,y)+k\Sigma E(i,j) \quad (7)$$

inputs image data I'(x, y) as a result of reflecting the integrated error ΣE(i, j) in the original image data I(x, y) to the data correcting unit 106.

In this embodiment, settings of the scan direction of pixels, error diffusion matrix, reference-threshold value Tb, and the like are arbitrary.

Second Embodiment

An image processing apparatus and method thereof according to the second embodiment of the present invention will be described below. Note that the same reference numerals in the second embodiment denote the same components as in the first embodiment, and a detailed description thereof will not be repeated.

As the second embodiment, an example in which error diffusion coefficients are changed according to the sum total of errors will be explained.

[Apparatus Arrangement]

FIG. 3 is a block diagram showing the functional arrangement of an image processing apparatus according to the second embodiment.

A threshold setting unit 102 of the second embodiment sets a threshold value T(x, y) based on original image data I(x, y) according to:

$$T(x,y)=Tb+N(x,y) \quad (8)$$

A coefficient setting unit 306 sets error diffusion coefficients M(x, y) based on the original image data I(x, y), an occurred error E(x, y), and an integrated error ΣE(i, j). FIGS. 4A to 4C are views showing an example of three types of error diffusion coefficients to be selectively set by the coefficient setting unit 306. The coefficient setting unit 306 selects these error diffusion coefficients as follows. Note that p is an arbitrary positive real number, and m is an arbitrary negative real number.

if (ΣE(i,j)>p and E(x,y)>0)

select error diffusion coefficients in FIG. 4B;

if (ΣE(i,j)<m and E(x,y)<0) (9)

select error diffusion coefficients in FIG. 4B;

Note that the error diffusion coefficients shown in FIG. 4B include larger error diffusion coefficients in the right direction when the scan direction of pixels is a left-to-right direction.

if (ΣE(i,j)>p and E(x,y)<0)

select error diffusion coefficients in FIG. 4C;

if (ΣE(i,j)<m and E(x,y)>0) (10)

select error diffusion coefficients in FIG. 4C;

Note that the error diffusion coefficients shown in FIG. 4C include smaller error diffusion coefficients in the right direction when the scan direction of pixels is a left-to-right direction.

else select error diffusion coefficients in FIG. 4A; (11)

Note that the error diffusion coefficients shown in FIG. 4A are normal error diffusion coefficients as in FIG. 2.

Of course, the error diffusion coefficients shown in FIGS. 4A to 4C are merely an example, and arbitrary error diffusion coefficients can be used. The number of selectable types of error diffusion coefficients is not limited to three, and an arbitrary number (three or more) of error diffusion coefficients may be prepared. In place of holding the plurality of types of error diffusion coefficients, error diffusion coefficients may be defined as a function of the original image data I(x, y), occurred error E(x, y), and integrated error ΣE(i, j), and may be obtained by calculations. Negative values may be used as coefficients.

That is, a characteristic feature of this embodiment lies in that an error to be diffused to a pixel, which is to be processed next to a pixel (x, y) of interest, or a non-processed pixel, which neighbors the pixel of interest on a scan line, is controlled based on the original image data I(x, y), occurred error E(x, y), and integrated error ΣE(i, j).

An error diffusion unit 105 of the second embodiment diffuses the occurred error E(x, y) to close pixels of the pixel (x, y) of interest using the error diffusion matrix set by the coefficient setting unit 306.

[Description of Principle]

This embodiment solves the delay problem of pixel generation by decreasing the integrated error ΣE(i, j) by setting the error diffusion coefficients M(x, y) based on the original image data I(x, y), occurred error E(x, y), and integrated error ΣE(i, j). The reason for this will be explained below.

When the integrated error ΣE(i, j) assumes a large positive value and the occurred error E(x, y) assumes a positive value, the error diffusion coefficients M(x, y) having larger coefficients in the right direction (scan direction) are set. Then, since large positive errors are diffused in the right direction, a binarization result O(x+1, y) output from a binarizing unit 103 tends to assume '1' and the occurred error E(x+1, y) tends to assume a negative value. Since this E(x+1, y) is added to the integrated error ΣE(i, j), the integrated error ΣE(i, j) consequently draws near to zero.

Likewise, when the integrated error ΣE(i, j) assumes a large positive value and the occurred error E(x, y) assumes a negative value, and when the integrated error ΣE(i, j) assumes a large negative value and the occurred error E(x, y) assumes a negative value, the integrated error ΣE(i, j) draws near to zero. Also, when the integrated error ΣE(i, j) assumes a large negative value and the occurred error E(x, y) assumes a positive value, and when the integrated error ΣE(i, j) assumes a large negative value and the occurred error E(x, y) assumes a negative value, the integrated error ΣE(i, j) draws near to zero.

The fact that the integrated error ΣE(i, j) draws near to zero is equivalent to that a difference between the average value of the original image data I(x, y) and that of the binarization results O(x, y) draws near to zero in a calculation region of the error E(i, j). For this reason, delay of pixel generation is suppressed, and reproducibility of a fine line can be improved.

In this embodiment, settings of the scan direction of pixels, a reference-threshold value Tb, and the like are arbitrary.

Third Embodiment

An image processing apparatus and method thereof according to the third embodiment of the present invention will be described below. Note that the same reference numerals in the third embodiment denote the same components as in the first and second embodiments, and a detailed description thereof will not be repeated.

The first embodiment has described the example using the predetermined coefficient k. In this case, the graininess of an image deteriorates occasionally. The third embodiment will explain an example in which the value of the coefficient k is dynamically changed.

[Apparatus Arrangement]

Figure 5:
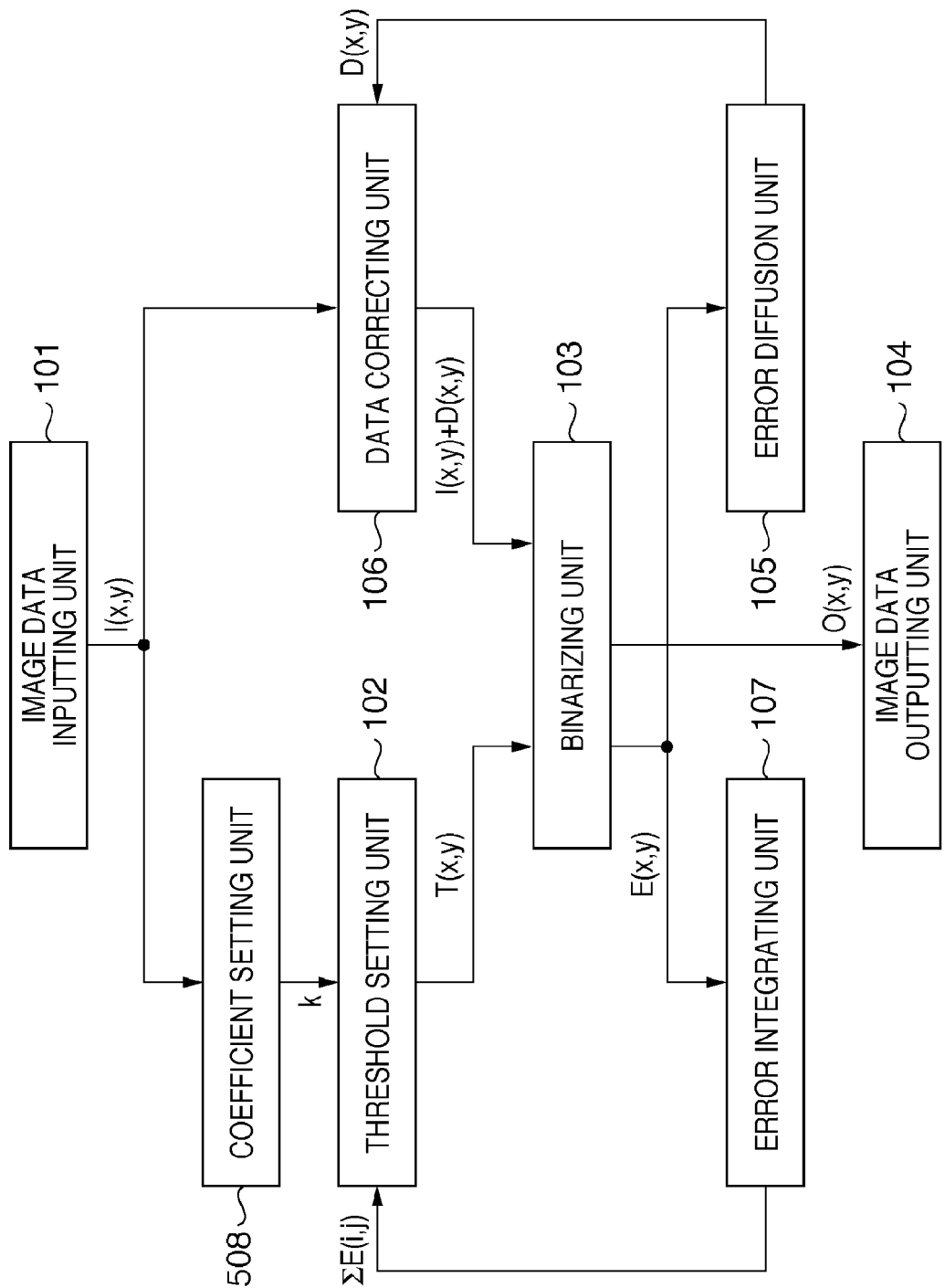
FIG. 5 is a block diagram showing the functional arrangement of an image processing apparatus according to the third embodiment.

FIG. 5 is a block diagram showing the functional arrangement of an image processing apparatus according to the third embodiment.

A coefficient setting unit 508 sets a coefficient k (feedback parameter) based on original image data I(x, y). The coefficient k is a parameter used to control the degree of reclaiming delay of pixel generation and reproducibility of a fine line. According to the experiments of the inventors, when a large coefficient k is set, slight graininess deterioration is confirmed in high and low density regions. That is, the degree of reducing delay of pixel generation and reproducibility of a fine line (the value of the coefficient k) and the graininess have a tradeoff relationship between them.

Hence, a large coefficient k is set for a region where delay of pixel generation readily occurs and a region including a fine line, and the problems of delay of pixel generation and reproducibility of a fine line are solved. A small coefficient k is set (zero may be set) for other regions, thus suppressing deterioration of the graininess.

The region where delay of pixel generation readily occurs and the region including a fine line can be considered as, for example, a region including an edge. Hence, using a difference between a value I(x, y) of a pixel of interest of original image data and an average value of pixel values of close pixels of the pixel (x, y) of interest, the coefficient k is set by:

$$k = |I(x,y) - A(x,y)| \quad (12)$$

where A(x, y) is the average value of pixel values of close pixels.

The range of close pixels is defined by x±a and y±b (a and b are arbitrary natural numbers).

Note that in place of the difference between the pixel value I(x, y) of the pixel of interest of the original image data and the average value A(x, y) of the pixel values of the close pixels, a differential value of the pixel value I(x, y) of the pixel of interest may be used. Also, the average value of output values O(x, y) of the close pixels may be used.

Since delay of pixel generation readily occurs in a pixel immediately after the beginning of tone conversion processing, the coefficient k may be set according to the pixel position. In place of setting the coefficient k for each pixel, an image region may be divided into regions each having an arbitrary size, and the coefficient k may be set for each divided region.

An image used in computer aided design (CAD) is often appended with graphic information, and the coefficient k may be set using this additional information.

That is, a characteristic feature of the third embodiment lies in that a region where delay of pixel generation readily occurs and a region including a fine line are determined, and the value of the coefficient k is set according to the determination result.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforementioned storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-109546, filed Apr. 18, 2008, which is hereby incorporated by reference herein in its entirety.

What is claimed is:

1. An image processing apparatus comprising:
an input section, configured to input image data of a pixel of interest;
an adder, configured to add diffusion data diffused from errors occurred by decrease of a tonal number of image data to the image data of the pixel of interest;
a converter, configured to decrease the tonal number of the image data of the pixel of interest, to which the diffusion data has been added, using an error diffusion method or minimized average error method; and
a diffuser, configured to diffuse an error occurred in the decrease of the tonal number for the pixel of interest to pixels close to the pixel of interest,
wherein the apparatus further comprising:
a calculator, configured to integrate, per a pixel, the errors occurred by the decrease of the tonal number of the image data in a predetermined image region as a total amount of the errors, wherein the predetermined image region is larger than an area including the pixels to which the error is diffused by the diffuser; and
a threshold setting section, configured to set a threshold value used in the error diffusion method or minimized average error method based on the image data of the pixel of interest and the total amount so that the threshold value becomes small when the total amount becomes large, and the threshold value becomes large when the total amount becomes small.

2. The apparatus according to claim 1, wherein the threshold setting section sets the threshold value based on the image data of the pixel of interest, and a product of the total amount and a predetermined coefficient.

3. The apparatus according to claim 2, wherein the threshold setting section calculates the threshold value by subtracting the product from a sum of a threshold value uniquely defined from the image data of the pixel of interest and a threshold noise uniquely defined from a pixel position of the pixel of interest.

4. The apparatus according to claim 1, further comprising a coefficient setting section configured to set a coefficient indicating a degree that the total amount influences the setting of the threshold value, based on the image data of the pixel of interest.

5. The apparatus according to claim 4, wherein the threshold setting section sets the threshold value based on the image data of the pixel of interest, and a product of the total amount and the coefficient.

6. The apparatus according to claim 5, wherein the threshold setting section calculates the threshold value by subtracting the product from a sum of a threshold value uniquely defined from the image data of the pixel of interest and a threshold noise uniquely defined from a pixel position of the pixel of interest.

7. The apparatus according to claim 4, wherein the coefficient setting section sets a large value as the coefficient in a region of an input image that includes an edge, and sets a small value as the coefficient in a region of the input image that does not include the edge.

8. The apparatus according to claim 1, wherein the calculator restricts the total amount to an upper limit value when the total amount exceeds the upper limit value, and restricts the total amount to a lower limit value when the total amount is lower than the lower limit value.

9. The apparatus according to claim 1, wherein the threshold setting section sets the threshold value so that the total amount is drawn to a zero near.

10. An image processing method comprising the steps of:
inputting image data of a pixel of interest;
adding diffusion data diffused from errors occurred by decrease of a tonal number of image data to the image data of the pixel of interest;
decreasing the tonal number of the image data of the pixel of interest, to which the diffusion data has been added, using an error diffusion method or minimized average error method; and
diffusing an error occurred in the decrease of the tonal number for the pixel of interest to pixels close to the pixel of interest,
wherein the method further comprising the steps of:
integrating, per a pixel, the errors occurred by the decrease of the tonal number of the image data in a predetermined image region as a total amount of the errors, wherein the predetermined image region is larger than an area including the pixels to which the error is diffused in the diffusing step; and
setting a threshold value used in the error diffusion method or minimized average error method based on the image data of the pixel of interest and the total amount so that the threshold value becomes small when the total amount becomes large, and the threshold value becomes large when the total amount becomes small.

11. A non-transitory computer-readable medium storing a computer-executable program for causing a computer to perform an image processing method, the method comprising the steps of:
inputting image data of a pixel of interest;
adding diffusion data diffused from errors occurred by decrease of a tonal number of image data to the image data of the pixel of interest;
decreasing the tonal number of the image data of the pixel of interest, to which the diffusion data has been added, using an error diffusion method or minimized average error method; and
diffusing an error occurred in the decrease of the tonal number for the pixel of interest to pixels close to the pixel of interest,
wherein the method further comprising the steps of:
integrating, per a pixel, the errors occurred by the decrease of the tonal number of the image data in a predetermined image region as a total amount of the errors, wherein the predetermined image region is larger than an area including the pixels to which the error is diffused in the diffusing step; and
setting a threshold value used in the error diffusion method or minimized average error method based on the image data of the pixel of interest and the total amount so that the threshold value becomes small when the total amount becomes large, and the threshold value becomes large when the total amount becomes small.

12. The apparatus according to claim 1, wherein the threshold setting section sets the threshold value based on a result of subtracting a product of the total amount and a coefficient from a reference-threshold value uniquely defined based on the image data.

13. The apparatus according to claim 1, wherein the predetermined region is an image region including pixels on which the decrease of the tonal number of the image data has been performed.

14. The apparatus according to claim 1, wherein the predetermined region is an image region including pixels for at least one line on which the decrease of the tonal number of the image data has been performed.

* * * * *